(12) United States Patent
Takashima et al.

(10) Patent No.: US 9,894,844 B2
(45) Date of Patent: Feb. 20, 2018

(54) AIR EMISSION DEVICE FOR GROWING PLANTS

(71) Applicants: FUJI SEIKO CO., LTD., Hashima-shi (JP); FUJI SHOJI CO., LTD., Hashima-shi (JP)

(72) Inventors: Katsunori Takashima, Hashima (JP); Masashi Yoshida, Hashima (JP)

(73) Assignees: FUJI SEIKO CO., LTD., Hashima-shi (JP); FUJI SHOJI CO., LTD., Hashima-shi (JP)

( * ) Notice: Subject to any disclaimer, the term of this patent is extended or adjusted under 35 U.S.C. 154(b) by 98 days.

(21) Appl. No.: 14/772,545

(22) PCT Filed: Mar. 14, 2014

(86) PCT No.: PCT/JP2014/056878
§ 371 (c)(1),
(2) Date: Sep. 3, 2015

(87) PCT Pub. No.: WO2014/162848
PCT Pub. Date: Oct. 9, 2014

(65) Prior Publication Data
US 2016/0007544 A1 Jan. 14, 2016

(30) Foreign Application Priority Data

Apr. 3, 2013 (JP) ................. 2013-077341

(51) Int. Cl.
*A01G 9/08* (2006.01)
*A01G 7/06* (2006.01)
(Continued)

(52) U.S. Cl.
CPC ............... *A01G 7/06* (2013.01); *A01G 7/02* (2013.01); *A01G 7/045* (2013.01); *A01G 9/18* (2013.01); *Y02P 60/146* (2015.11)

(58) Field of Classification Search
CPC . A01G 7/02; A01G 7/06; A01G 9/246; A01G 9/18; A01G 9/24; A01G 31/02
See application file for complete search history.

(56) References Cited

U.S. PATENT DOCUMENTS

| 4,569,150 A | 2/1986 | Carlson et al. |
| 5,299,383 A * | 4/1994 | Takakura ............... A01G 9/246 47/17 |

(Continued)

FOREIGN PATENT DOCUMENTS

| JP | 2002 142585 | 5/2002 |
| JP | 2009 273481 | 11/2009 |

(Continued)

OTHER PUBLICATIONS

Extended Search Report dated Feb. 25, 2016 in European Patent Application No. 14779648.6.

(Continued)

*Primary Examiner* — Kristen C Hayes
(74) *Attorney, Agent, or Firm* — Oblon, McClelland, Maier & Neustadt, L.L.P.

(57) ABSTRACT

The air emission device for growing plants includes a plurality of air emission units for respectively emitting an air flow onto the new leaves growing on a tip of a stem of each plant that has one stem. The transpiration effect on the leaves and suctioning of water and nutrition from the roots of the plants can be promoted. Thus, wilting of leaves can be prevented and the tip burn due to insufficient calcium can be avoided. Provision of the air emission units are effectively arranged to evenly or uniformly supply air onto the new leaves of the each plant.

3 Claims, 6 Drawing Sheets

(51) Int. Cl.
*A01G 7/02* (2006.01)
*A01G 7/04* (2006.01)
*A01G 9/18* (2006.01)

(56) References Cited

U.S. PATENT DOCUMENTS

| | | | | |
|---|---|---|---|---|
| 5,713,154 | A * | 2/1998 | Goldstein | A01G 9/24 47/17 |
| 9,480,207 | B2 * | 11/2016 | Tanase | A01G 7/045 |
| 2010/0275512 | A1 * | 11/2010 | Nien | A01G 9/16 47/66.7 |
| 2013/0000185 | A1 * | 1/2013 | Tanase | A01G 7/045 47/17 |
| 2013/0111811 | A1 * | 5/2013 | Miyauchi | A01G 7/06 47/57.7 |
| 2016/0278313 | A1 * | 9/2016 | Kao | A01G 9/246 |
| 2016/0286737 | A1 * | 10/2016 | Kisting | A01G 9/18 |

FOREIGN PATENT DOCUMENTS

| | | |
|---|---|---|
| JP | 2010 17153 | 1/2010 |
| JP | 2012 125196 | 7/2012 |
| JP | 2012 231730 | 11/2012 |
| NL | 1 033 212 C2 | 7/2007 |
| WO | WO 2011/117778 A1 | 9/2011 |

OTHER PUBLICATIONS

Search Report and Written Opinion with a letter from the Singapore Patent Attorney dated Nov. 16, 2016 in Singaporean Patent Application No. 11201508131T.
International Search Report dated Jun. 17, 2014 in PCT/JP2014/056878 Filed Mar. 14, 2014.

* cited by examiner

AIR EMISSION DEVICE FOR GROWING PLANTS

TECHNICAL FIELD

The present invention relates to an air emission device for growing plants.

BACKGROUND ART

As a plant cultivating factory equipment, it has been hitherto known that the air-conditioner and the artificial lighting device are used to adjust the cultivating environment for growing plants in the plant cultivating factory.

As an example of known technology, according to Patent Literature 1, the air whose temperature, humidity and concentration of carbon dioxide ($CO_2$) have been adjusted, is supplied from the air suction port provided at the side wall of a cultivating chamber, and thus supplied air is circulated at a predetermined wind speed through the space between neighboring panels formed in chevron shape in cross section by a blast fan provided at the side wall, the plants being cultivated on the panels. By this air circulation, transpiration is promoted and suction of water and nutrients from the roots can be promoted to prevent tip burn (tip rotting) and withering or wilting of leaves caused by shortage of calcium. The photonic synthesis can be promoted by adjusting the concentration of the carbon dioxide to thereby promote growth of plants.

CITATION LIST

Patent Literature

[Patent Literature 1] JP 2002-142585A

SUMMARY OF THE INVENTION

Technical Problem

However, according to the conventional plant cultivating facility disclosed in the Patent Literature 1, the suction port and the blast fan used as the air conditioning facility are provided at the side wall and the air is circulated through the entire cultivating chamber by the blast fan provided on the side wall. This circulation system needs a blast fan which outputs a strong wind and a large volume of air. Therefore the cultivated plants located near the blast fan and the cultivated plants located far from the blast fan have different conditions. The cultivated plants near the blast fan may receive the strong wind and may be directly damaged thereby, but the cultivated plants located far from the blast fan may receive less wind due to an interruption by the other plants and accordingly, a smooth air circulation is not performed and the carbon dioxide necessary for photonic synthesis effect cannot be sufficiently obtained. Thereby, as promotion of transpiration is prevented, the tip burn may possibly occur.

The invention was made considering the above issues of the conventional technology and the objective of the invention is to provide an air emission device for growing plants that emits an air flow uniformly onto a plurality of plants being cultivated in a plant cultivating facility.

Solution to Problem

In order to solve the above-described problem, the air emission device for growing plants according to a first aspect includes a plurality of air emission units that respectively emits an air flow onto new leaves growing on a tip of a stem of each plant that has one stem.

The air emission device for growing plant according to a second aspect is characterized in that in addition to the first aspect, the air of the air flow is adjusted to be air with high humidity and high concentration of carbon dioxide and is supplied to the plurality of air emission units from an air supply source through a pipe.

The air emission device for growing plants according to a third aspect is characterized in that in addition to the feature of the first aspect, each of the plurality of air emission units accommodates therein a fan which generates the air flow to emit the air and a motor which drives the fan.

The air emission device for growing plants according to a fourth aspect is characterized in that in addition to any one of the features of the first to third aspects, each of the plurality of air emission units includes a light emitting device which emits a light onto the each plant.

The air emission device for growing plants according to a fifth aspect is characterized in that in addition to the feature of the fourth aspect, each of the light emitting devices is provided with a stem growth-inhibiting light source at a central portion thereof for emitting a stem growth-inhibiting light having a blue component light at high ratio, which inhibits a growth of stem, and is provided with a leaf growth-promoting light source around the stem growth-inhibiting light source for emitting a leaf growth-promoting light having a red component light at high ratio, which promotes a growth of leaf.

The air emission device for growing plants according to a sixth aspect is characterized in that in addition to the feature of the second aspect, the air emission device for growing plants further includes an air emission unit supporting device which supports and locates the each of the air emission units at a proper position for the same to face to each plant. The air emission unit supporting device includes a support bar that extends in a lateral direction above the plants and is provided with a communication passage therein through which the air supplied from the air supply source flows, a plurality of air emitting ports through which the flowing air is emitted towards the each plant, serving as the air emission unit, and a light emitting device provided around the periphery of the air emitting ports for emitting a light onto the each plant.

According to the first aspect, the air flow is respectively emitted to the new leaves growing on the tip of the stem of each plant that has one stem from the respective air emission units. Thus, by emitting the air flow towards the new leaves growing on the respective tip, the transpiration from the leaves can be promoted and also the suction of water and nutrition from the root of the each plant can be also promoted. Thus, the wilting of the leaves can be prevented and at the same time tip burns caused by the shortage of calcium can be prevented. Since the each air emission unit is provided close to the new leaves of the each plant, the air flow amount from the air emission unit can be reduced and damages to the leaves which may be caused by the contact of the leaves by a strong wind can be prevented.

According to the second aspect, the air of the air flow adjusted to be air with high humidity and high concentration of carbon dioxide is supplied to the plurality of air emission units from the air supply source through a pipe. Thus, the carbon dioxide necessary for photonic synthesis for the plants can be effectively supplied to the respective plants and at the same time the desiccation of the leaves can be prevented by the emission of the air with humidity adjusted to be high humidity. Thereby, the photonic synthesis can be effectively achieved to promote the growth of the plants.

According to the third aspect, each of the plurality of air emission units accommodates therein a fan which generates the air flow to emit the air and a motor which drives the fan. Accordingly, the air emission unit can be a simple and low cost structure without providing a large air emission facility which includes piping for supplying the air and a large air supply apparatus.

According to the fourth aspect, each of the plurality of air emission units includes a light emitting device which emits a light onto the each plant. Accordingly, since the light emitting device would not interrupt the emission of the air from the air emission unit, the air can be effectively emitted to the leaves and the stem portion from a position where the light emitting device emits the light. Since the air emission unit and the light emitting device are formed in a unit as one device, the simplifying of the device can be achieved.

According to the fifth aspect, each of the light emitting devices is provided with a stem growth-inhibiting light source at a central portion thereof for emitting a stem growth-inhibiting light having a blue component light at high ratio, which inhibits a growth of stem, and is provided with a leaf growth-promoting light source around the stem growth-inhibiting light source for emitting a leaf growth-promoting light having a red component light at high ratio, which promotes a growth of leaf. Accordingly, the growth of the stem can be inhibited and at the same time the growth of the leaf can be promoted. Thus, the commercial value of the plants which leaves are supplied as a food can be improved.

According to the sixth aspect, the support bar is used as a communication passage for supplying the air and the air is emitted to the plants from the air emitting port which is provided at the support bar. This can simplify the structure of the air emission device for growing plants so that the device is formed with less manufacturing cost. Further, since the light source device is located around the air emitting port, the emission of the air to the plants from the air emitting port and cooling of the heat generated at the light emitting from the light source device can be performed at the same time.

DESCRIPTION OF EMBODIMENTS (First Embodiment)

Figure 1:
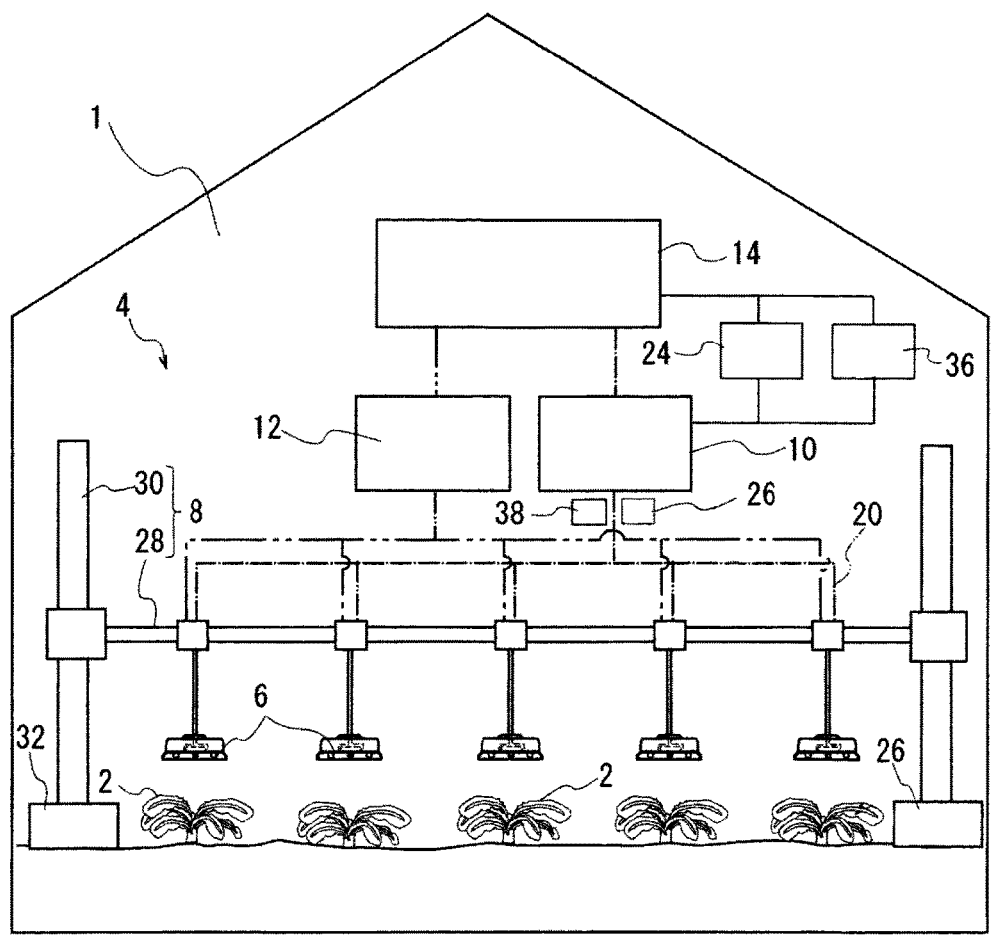
FIG. 1 is an overall view showing an air emission device for growing plants in accordance with the present invention.

Hereinafter, the air emission device for growing plants according to the first embodiment of the present invention will be explained with reference to the attached drawings. In this embodiment, as the growing plant, a leaf lettuce 2 is used. The air emission device 4 for growing plants is provided in a cultivating chamber 1 as shown in FIG. 1 and includes a plurality of air emission units 6 which is combined with a light emitting device 5, an air emission unit supporting device 8 which supports and locates each of the air emission units 6 at proper position for the same to face to each leaf lettuce 2, an air pump 10 as an air supply source supplying the air to the air emission units 6, a power supplying portion 12 for supplying power to the plurality of light emitting devices 5 and a control device 14 which controls the amount of air flow from the air pump 10 and at the same time controls the types of LED (Light Emitting Diode) and the intensity of the light emitted from the light emitting devices 5.

Figure 2:
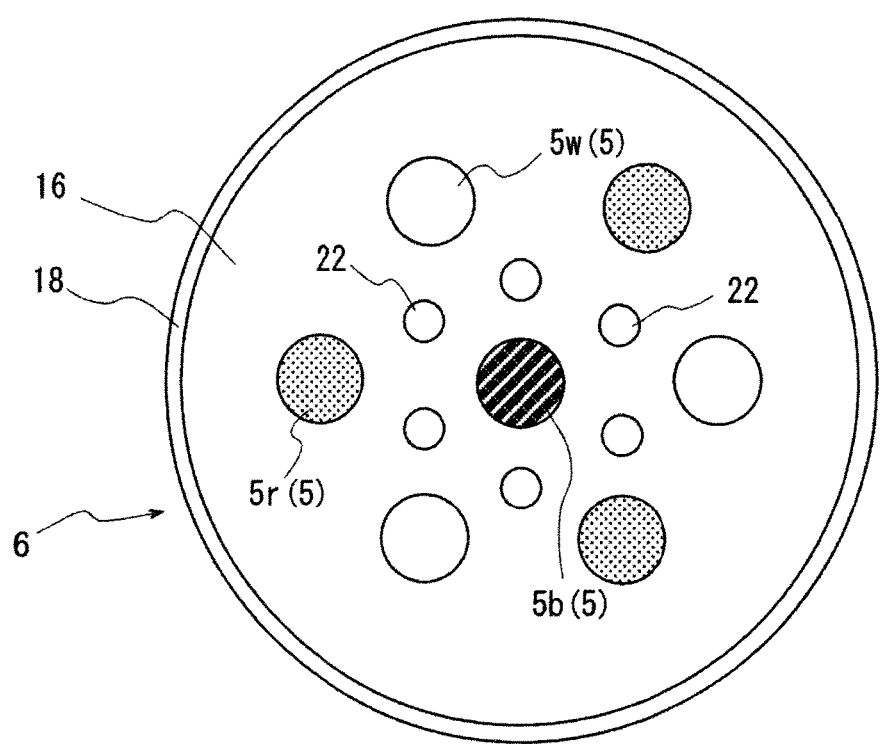
FIG. 2 is a view showing a lower surface of the air emitting portion and the light emitting device.
Figure 3:
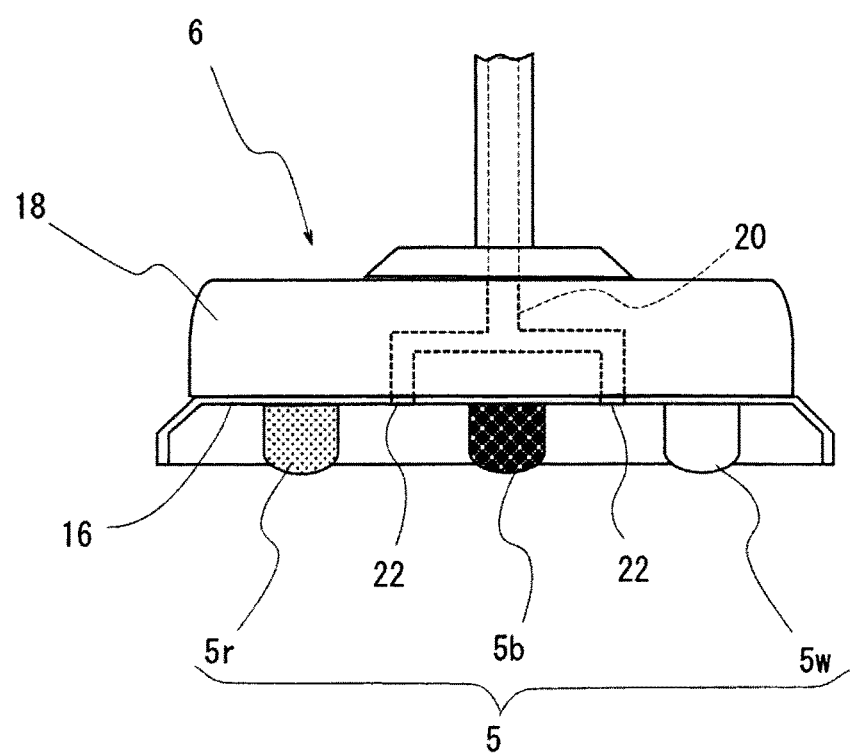
FIG. 3 is a side view showing the air emitting portion in a side surface view and the light emitting device in cross section.
Figure 4:
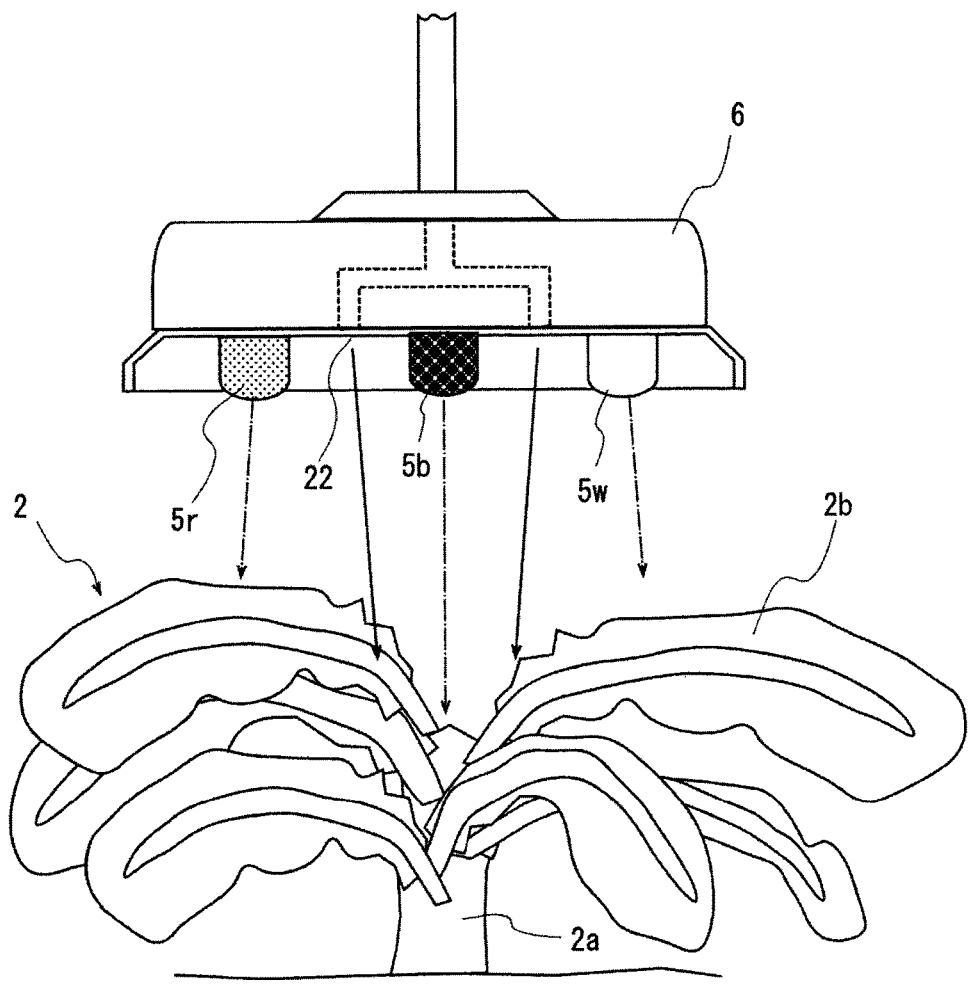
FIG. 4 is a view showing a state of emitting air to a plant by the air emission unit and a state of emitting light to the plant by the light emitting device.

As shown in FIG. 2 and FIG. 3, each of the air emission units 6 includes a disc shaped base plate 16 and a casing portion 18 which holds the base plate 16 at the lower end thereof. A plurality of openings (air emitting ports) 22 of air pipes 20 in communication with the air pump 10 is provided at a central portion of the base plate 16 with a predetermined distance separated from one another. A blue LED (light emitting diode) 5b with shell shape is provided at the central portion of the under surface of the base plate 16 and a plurality of red LEDs 5r and a plurality of white LEDs 5w each having a shell shape are provided at the peripheral portion of the under surface of the base plate 16, surrounding the central openings. The blue LED 5b has a peak wavelength of 470 nm, whereas the red LED 5r has the peak wavelength of 660 nm. The white LED 5w is formed by coating a yellow fluorescent material on the blue LED 5b.

The air pump 10 is provided with an air suction port (not shown) and a carbon dioxide reservoir tank 24 is provided adjacently. By mixing the carbon dioxide with the air, the air with any desired carbon oxide concentration can be composed by using the carbon dioxide reserved in the reservoir tank 24. Further, by using a humidifier device 36 which is equipped with a humidifier (not shown) and a humidity sensor 38, the humidity of the composed air whose concentration of the carbon dioxide is adjusted, can be raised to, for example, 70 to 80%. Thus, the air whose carbon oxide concentration and the humidity have been adjusted is supplied to the air emission units 6 via the air pipe (corresponding to the pipe) by the air pump 10.

The power supply portion 12 supplies the electric power so that only a particular color LED (light emitting device) 5 is emitted or the light emission is performed by changing the intensity of light of the LED 5 to be emitted. The stem growth-inhibiting light source is formed by the blue LED 5b and the leaf growth-promoting light source is formed by the red LEDs 5r and the white LEDs 5w.

The control device 14 adjusts the concentration of the carbon dioxide included in the air by introducing the carbon dioxide into the air pipe 20 from the carbon dioxide reservoir tank 24 when the air is supplied to the air pipe 20 by the air pump 10. A carbon dioxide concentration detecting sensor 26 is provided in the air pipe 20 on the way from the air pump 10 to the air emission units 6. The control device 14 adjusts the amount of the carbon dioxide to be supplied based on the detection signal from the carbon dioxide concentration detecting sensor 26, and further adjusts the humidity of the air by the humidifier of the humidifier device 36 based on the detected value of the humidity sensor 38. Further, the control device 14 is equipped with, for example, a light modulating circuit (not shown) for controlling the power supplying portion 12 based on the growing state of the leaf lettuce such that the lights to be emitted from the blue LED 5b, red LED 5r and white LED 5w of the light emitting device 5 are controlled (for example, turning ON/OFF, intensity of the light and so on). The light intensity of the emitted light ranges, for example, from 50 to 500 $\mu mol\ m^{-2}\ s^{-1}$, expressed as the photosynthesis-effective photon flux density (PPFD).

The air emission unit supporting device 8 includes a support bar 28 that supports the air emission units and the light emitting devices 5, support posts 30 each of which accommodates therein a ball screw mechanism (not shown) for moving the support bar 28 in an up/down direction, and a drive device (electric motor) 32 for driving the ball screw mechanism to move the support bar 28 in the up/down direction. Thus, the air emission unit supporting device 8 supports and locates the air emission units 6 and the light emitting devices 5 at proper positions in response to the growing state of the leaf lettuces 2.

Hereinafter, the operation of the air emission device 4 for growing plants thus arranged will be explained with reference to the drawings. First, seeds of the leaf lettuces 2 are planted, and watered. Then seed leaves are germinated from the seeds, and during a period, for example, from the 3rd to 10th day after seeding when the stem portions 2a and the leaves 2b become distinguishable, light is emitted only from the blue LEDs 5b of the light emitting device 5 of the air emission device 4 on tops of the stem portions 2a, each having a growing point, whereas light is emitted from the red LEDs 5r on the leaves 2b. A plurality of leaves 2b is growing around one stem portion 2a in the case of the leaf lettuce 2. The light emitting time is determined to, for example, 16 hours, per day and the emitted light intensity is determined to, for example, 100 $\mu mol\ m^{-2}\ s^{-1}$. After passing the leaf germination period, new leaves 2b (young leaves) are growing from the stem portion 2a. During the light from the red LED 5r is emitted to the leaves 2b, the air flow from the air emission units 6 is emitted to the respective young leaves (leaves 2b). Upon this emission, the air whose carbon dioxide concentration is raised to 1000 ppm is emitted. Therefore, the photonic synthesis can be promoted to promote the growth of the leaves 2b. It is noted that since the photonic synthesis is not performed while the light from the red LED 5r is not emitted to the leaves 2b, the air with normal concentration of the carbon dioxide (not highly concentrated) is emitted.

At a period from the 10th to 20th day, the light from the blue LED 5b is emitted to the stem portion 2a and the lights from the red LEDs 5r and the white LEDs 5w are emitted to the leaves 2b. The emission time is determined, for example, to 24 hours per day, and the emission light intensity is determined, for example, to 100 $\mu mol\ m^{-2}\ s^{-1}$. While the lights from the red and white LEDs are emitted to the leaves 2b, the air from the air emission units 6 is emitted towards the leaves 2b. In this period, the air whose carbon dioxide concentration is raised to, for example, 1500 ppm is emitted. Thereby, the photonic synthesis can be promoted to promote the growth of the leaves 2b.

During a period from the 20th to 30th day, the light emission from the blue LED 5b and the red LEDs 5r is stopped and the light emission from the white LEDs 5w is only performed. The emission time is determined to, for example, 24 hours per day, and the emission light intensity is determined, for example, to 150 $\mu mol\ m^{-2}\ s^{-1}$. In this period, the air whose carbon dioxide concentration is raised to, for example, 2000 ppm is emitted from the openings 22. By emitting the air adjusted to have a high humidity at the same time, the desiccation of the leaves 2b of the leaf lettuces 2 (plants) can be prevented by the emission of the air with high humidity. Thus, the photonic synthesis can be effectively performed to promote the growth of the leaves 2b.

Thus, by emitting the air flow to the leaves 2b from the position close to the leaves 2b of the leaf lettuce 2, the air is circulated around the leaves 2b of the each of the leaf lettuces 2 evenly or uniformly, without being interrupted by the other individual leaf lettuces 2. This air circulation promotes the transpiration from the leaves 2b and also the suction of water and nutrition from the root of each leaf lettuce 2. Thus, the tip burns caused by the shortage of calcium can be prevented, and at the same time the wilting of the stem portion and the leaves can be prevented.

Since the leaf lettuce 2 growing under the lights emitted from the LEDs and the emission of the air flow, as described above, grows to be healthy and to be in nutrition well spreading state, so that the leaves 2b densely grow, exhibit a deep color, and widely spread, and the stem portion 2a is kept short, being inhibited from growing long. As a result, the ratio of the leaves 2b used for food increases and the commercial value of the leaf lettuces 2 can be improved.

Further, since the light emitting device 5 is formed by the LEDs, the consumed electric power is small to save energy. Further, since the durability life of the LED as a light source is long to achieve reduction of running cost. The LED also can be controlled easily in the wavelength of the light to easily create monochromatic light.

Further, the light emitting device 5 includes blue LED 5b that emits the light to the area facing to the stem portion 2a of the leaf lettuce 2, which comprises a blue component light at high ratio and inhibits the growth of the stem 2a, and red LED 5r that emits the light to the area facing to the leaves 2b of the leaf lettuce 2, which comprises a red component light at high ratio and promotes the growth of the leaves 2b. Thereby, the light from the blue LED 5b for inhibiting the growth of the stem portion 2a can be emitted on the top of the stem portion 2a and the lights from the red LEDs 5r for promoting the growth of the leaves 2b can be emitted on the leaves 2b.

As apparent from the above explanation, according to the air emission device 4 of the embodiment, the air flow is respectively emitted to the young leaves (leaves) 2b growing at the tip of the stem portion 2a of the each of leaf lettuces 2 each of which has one stem portion 2a, by the plurality of air emission units 6. By emitting the air flow to the new leaves growing on the tip of the stem portion 2a of the respective leaf lettuce 2, the transpiration from the leaves 2b can be promoted and also the suction of water and nutrition from the root of the respective leaf lettuce 2 can be also promoted. Thus, the wilting of the leaves 2b can be prevented and at the same time tip burns caused by the shortage of calcium can be prevented. Since the air emission unit 6 is located close to the new leaves 2b of the leaf lettuce 2, the air flow amount from the air emission unit 6 can be reduced and damages to the leaves 2b which may be caused by the contact of the leaves 2b by a strong wind can be prevented.

The air of which concentration of the carbon dioxide is adjusted to be a high value is supplied to the respective air emission units 6 from the air supply source 10 through the air pipe 20. Therefore, the carbon dioxide necessary for photonic synthesis for the leaf lettuces 2 can be effectively and fluently supplied to the respective leaf lettuces 2 and at the same time the desiccation of the leaves 2b can be prevented by the emission of the air with humidity adjusted to be high humidity. Thus, the growth of the leaf lettuces 2 can be effectively promoted.

Each of the plurality of air emission units 6 accommodates therein the fan 48 which generates the air flow to emit the air and the motor 52 which drives the fan 48. Accordingly, the air emission unit can be a simple and low cost structure without providing a large air emission facility which includes piping for supplying the air and a large air supply apparatus.

Still further, each of the plurality of air emission units 6 includes a light emitting device (LED) 5 which emits a light onto the leaf lettuce 2. Accordingly, since the light emitting device 5 would not interrupt the emission of the air from the air emission unit 6, the air can be effectively emitted to the leaves 2b and the stem portion 2a from a position where the light emitting device emits the light. Since the air emission unit 6 and the light emitting device 5 are formed in a unit as one device, the simplifying of the device can be achieved.

Further, since the light emitting device (LED) 5 is provided with blue LED 5b that emits the stem growth-inhibiting light having a blue component light at high ratio, which inhibits a growth of stem portion 2a, and is provided with red LEDs 5r that emit the leaf growth-promoting light around the blue LEDs 5b. Accordingly, the growth of the stem portion 2a can be inhibited and at the same time the growth of the leaves 2b can be promoted. Thus, the commercial value of the leaf lettuces whose leaves 2b are used as a food, can be improved.

(Second Embodiment)

Figure 5:
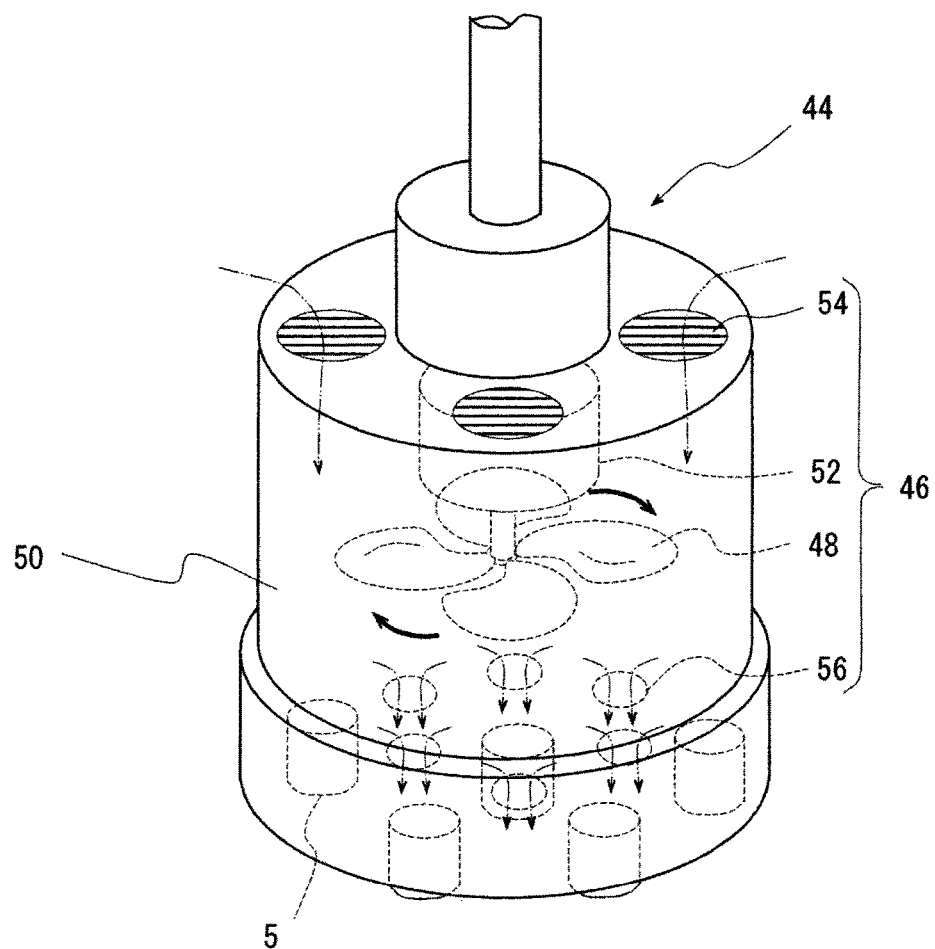
FIG. 5 is a view showing the air emission device for growing plants in accordance with the second embodiment of the present invention.

Next, the air emission device for growing plants according to the second embodiment will be explained with reference to FIG. 5. According to the air emission device 44 for growing plants of this embodiment, the structure of this embodiment is different from the first embodiment in that the air emitted from the air emission units 46 is not supplied from the air supply source, but the air inside the cultivating chamber 1 is emitted to the plants by the fan 48 housed in the air emission units 46. In more detail, each air emission unit 46 includes a motor 52 whose rotation axis is coaxial with the axis line of a cylindrical casing portion 50 and the fan 48 whose rotation shaft is connected to the motor 52. A plurality of air suction ports 54 is provided at a top panel of the casing portion 50. The air inside the cultivating chamber 1 is suctioned through the air suction ports 54. Thus suctioned air is emitted from the air emitting ports 56 by the fan 48 driven by the motor 52. The strength of the wind generated by the fan 48 is controlled by the control device. The structures of the light emitting device 5 and others are the same with those of the first embodiment and the explanation thereof will be omitted, merely added the same reference numerals/symbols.

According to the air emission device 44 for growing plants of the second embodiment, each air emission unit 46 houses the fan 48 which creates the air flow to emit the air and the motor 52 which drives the fan 48. Accordingly, without providing a large air supply facility and air piping, simple and low cost facility can be provided. Since the air emission unit 46 is located close to the new leaves 2b of the leaf lettuce 2, the air flow amount from the air emission unit 46 can be reduced and damages to the leaves 2b which may be caused by the contact of the adjacent leaves 2b by a strong wind can be prevented. By this air circulation, transpiration is promoted and suction of water and nutrients from the roots can be promoted to prevent wilting of leaves and tip burn.

(Third Embodiment)

Figure 6:
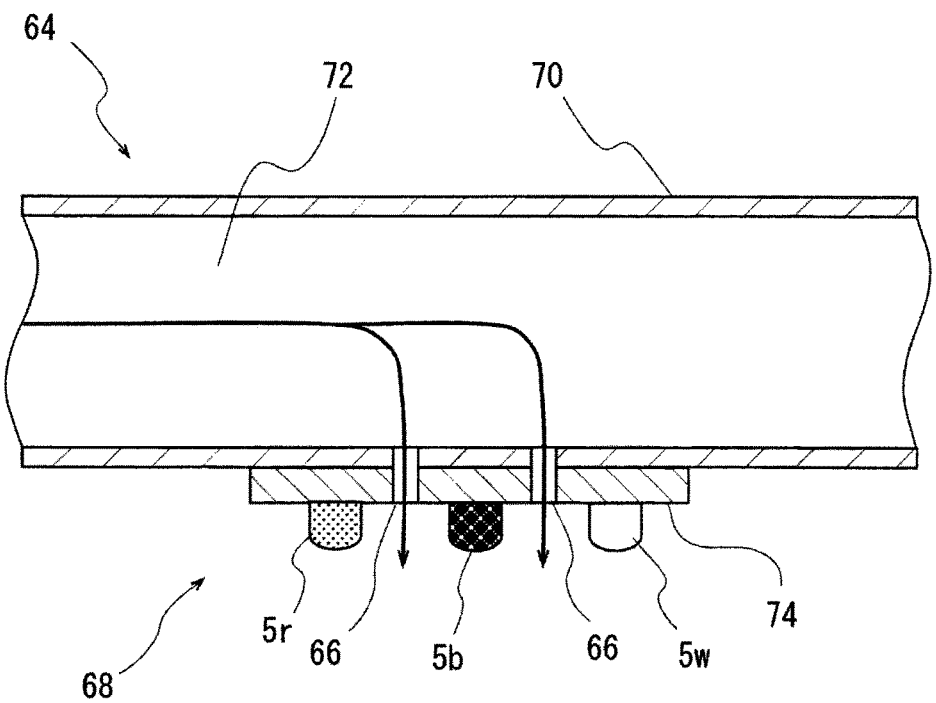
FIG. 6 is a view showing a front surface of the air emission device for growing plants in accordance with the third embodiment of the present invention, a portion thereof being shown in a cross section.
Figure 7:
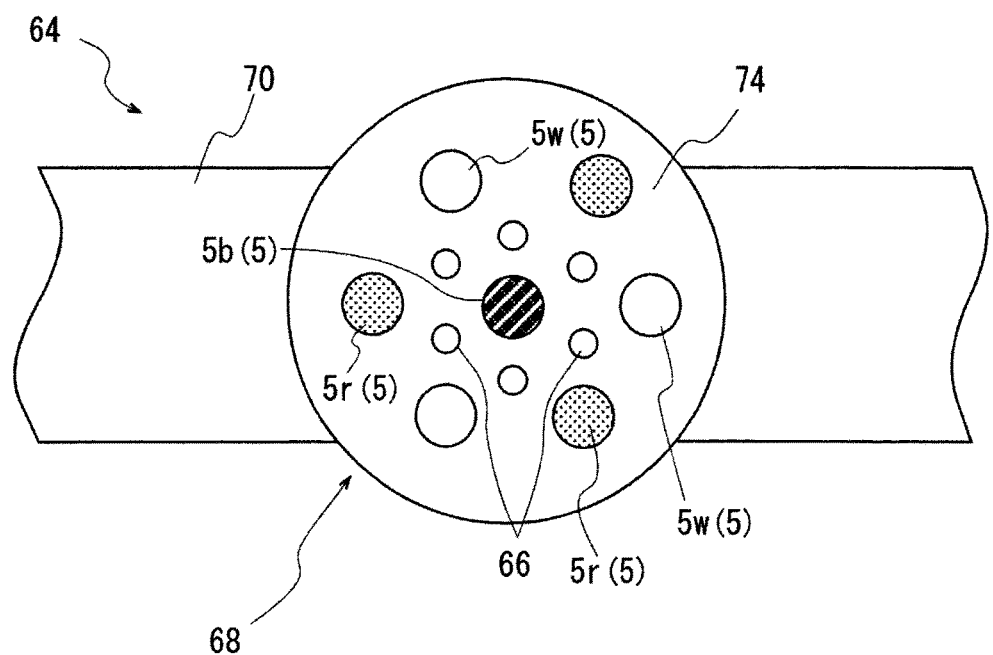
FIG. 7 is a view showing the lower surface of the air emission device for growing plants in accordance with the third embodiment of the present invention.

Next, the air emission device for growing plants according to the third embodiment will be explained with reference to FIG. 6 and FIG. 7. According to the air emission device 64 for growing plants of this embodiment, the structure of this embodiment is different from the first embodiment in that the support bar 70 of the air emission unit support device 8 is formed of, for example, an aluminum pipe and this pipe serves as the communication passage for the air flowing from the air pump 10, that the air emitting ports 66 as the air emission unit are provided through the peripheral wall of the support bar 70 and a disk shaped holding plate 74 directly attached to the support bar 70 at a portion thereof facing to the plants, for example, at the outer peripheral portion of the lower end portion of the pipe, and that a light source device 68 is provided to the holding plate 74 at the peripheral portion of the air emitting ports 66. The structures of the other devices are the same with those of the first embodiment and the explanation thereof will be omitted, merely added the same reference numerals/symbols.

In more detail, the holding plate 74 is either directly assembled to the support bar 70 by means of bolt screws or the like, or assembled to the support bar 70 with a band shaped bracket (not shown) enclosing the outer periphery of the support bar 70. Six air emitting ports 66 opening towards the lower side are provided through the holding plate 74 and the outer peripheral wall of the support bar 74 at respective vertex positions of a hexagonal shape. The blue LED 5b is attached to the holding plate 74 by means of socket (not shown) at the central position of the six air emitting ports 66. A plurality of red LEDs 5r (3 red LEDs) and a plurality of white LEDs 5w (3 white LEDs) are alternatively provided by means of socket at respective vertex positions of a hexagonal shape, outer than the positions of the six air emitting ports 66 centering on the blue LED 5b. These LEDs 5b, 5r and 5w form the light source device 68 and similar to the first embodiment, the electricity is supplied from the power supplying portion 12. According to the air emission device 64 for growing plants of this embodiment, cooling of heat generated upon emitting of light from the each of the LED 5b, 5r and 5w of the light source device 68 can be performed by the air emitted from the air emitting ports 66. Since the support bar 70 is used also as the communication passage 72 and the air is emitted to the plants from the air emitting ports 66 formed at the support bar 70, an air emission device 64 for growing plants can be formed compact in size and at low manufacturing cost.

it is noted that according to the embodiments, the air emission device for growing plants is formed as a combined device wherein the air emission unit and the light emitting device are combined as a unit. However, it is not limited to such combined device, but the air emission unit and the light emitting device can be formed separately.

it is noted that the air emission unit and the light emitting device are provided at a disc shaped base plate (holding plate). However, the shape of the holding plate is not limited to such shape, but may be formed to be of rectangular shape.

LEDs 5 are used as light emitters of the light emitting device, but it is not limited to those LEDs, but organic ELs (electroluminescence), for instance, may be used therefor. The organic ELs use less electricity and thereby expense of the electricity can be reduced. Further, the heat generation as a light source is small to prevent damages of the leaves due to the generated heat.

According to the embodiments, a leaf lettuce 2 is used as a plant. However, it is not limited to the leaf lettuce 2, but other plants, such as Komatsuna, a Japanese mustard spinach, Chingensai, a Chinese cabbage, or a spinach, etc., may be used.

The blue LED is used for a stem growth-inhibiting light and the red LEDs are used for the leaf growth-promoting light. However, it is not limited thereto and different LEDs may be selectively used, depending on the kind of plants. For example, the blue LEDs are used as the stem growth-inhibiting light for the leaf lettuce 2, but these blue LEDs are used as a stem growth promoting light for an eggplant.

The concrete structures explained in the embodiments above indicate examples of the embodiments of the invention and the invention is not limited to the structures explained above, but may be extended to various changes and modifications as long as they are within the scope of the subject matter of the invention.

INDUSTRIAL APPLICABILITY

The present invention can be used for cultivating plant having a portion whose growth is particularly desired, the growth of the portion being effectively promoted.

REFERENCE SIGNS LIST

2 . . . plant (leaf lettuce), 2a . . . stem portion, 2b . . . leaves, 4 . . . air emission device for growing plants, 5 . . . light emitting device (LED), 5b . . . stem growth-inhibiting light source device (blue LEDs), 5r . . . leaf growth promoting light source device, 6 . . . air emission unit, 10 . . . air supply source (air pump), 20 . . . pipe (air pipe), 44 . . . air emission device for growing plants, 46 . . . air emission unit, 48 . . . fan, 52 . . . motor, 64 . . . air emission device for growing plants, 66 . . . air emission unit (air emitting port), 68 . . . light source device.

The invention claimed is:

1. An air emission device for growing plants comprising:
    a plurality of air emission units that respectively emits an air flow onto new leaves growing on a tip of a stem of each plant of a plurality of plants, each plant having one stem, wherein
    air of the air flow is adjusted to be air with high humidity and high concentration of carbon dioxide and is supplied to the plurality of air emission units from an air supply source through a pipe,
    each of the plurality of air emission units is located at a position to each of the plurality of plants and each of the plurality of air emission units includes a light emitting device for emitting a light onto each of the plurality of plants,
    the light emitting device is provided with a stem growth-inhibiting light source at a central portion thereof facing the stem to emit a stem growth-inhibiting light having a blue component light at a ratio which inhibits growth of the stem, and with a leaf growth-promoting light source around the stem growth-inhibiting light source facing the new leaves growing on the tip of the stem to emit a leaf growth-promoting light having a red component light at a ratio which promotes a growth of leaf, and
    each of the plurality of air emission units includes a disc shaped base plate on which the light emitting device is provided, and a plurality of air emitting ports is provided on the base plate between the stem growth-inhibiting light source and the leaf growth-promoting light source in a radial direction of the base plate.

2. The air emission device for growing plants according to claim 1, further comprising:
    an air emission unit supporting device which adjustably supports the plurality of air emission units in an up/down direction, wherein
    the air emission unit supporting device supports the plurality of air emission units and the light emitting devices at any position for the plurality of air emission units and the light emitting devices to face the plurality of plants respectively.

3. The air emission device for growing plants according to claim 2, wherein
    the air emission unit supporting device includes a support bar that extends in a lateral direction above the plants and is movable in the up/down direction, and
    the support bar is used as the pipe which is provided with a communication passage therein through which the air supplied from the air supply source flows to each of the air emission units.

\* \* \* \* \*